United States Patent
Livathinos et al.

(10) Patent No.: US 11,940,962 B2
(45) Date of Patent: Mar. 26, 2024

(54) PREPARING A DATABASE FOR A DOMAIN SPECIFIC APPLICATION USING A CENTRALIZED DATA REPOSITORY

(71) Applicant: International Business Machines Corporation, Armonk, NY (US)

(72) Inventors: Nikolaos Livathinos, Adliswil (CH); Maksym Lysak, Waedenswil (CH); Viktor Kuropiatnyk, Horgen (CH); Cesar Berrospi Ramis, Zurich (CH); Peter Willem Jan Staar, Zurich (CH); Abderrahim Labbi, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 17/546,265

(22) Filed: Dec. 9, 2021

(65) Prior Publication Data

US 2023/0185776 A1    Jun. 15, 2023

(51) Int. Cl.
*G06F 16/21* (2019.01)

(52) U.S. Cl.
CPC .................. *G06F 16/211* (2019.01)

(58) Field of Classification Search
CPC ................................ G06F 16/211
USPC ........................................ 707/791
See application file for complete search history.

(56) References Cited

U.S. PATENT DOCUMENTS

| | | | |
|---|---|---|---|
| 6,615,220 B1 | 9/2003 | Austin | |
| 6,907,428 B2 | 6/2005 | Fitzpatrick | |
| 7,444,342 B1 | 10/2008 | Hall | |
| 7,490,059 B2 | 2/2009 | Albee | |
| 7,496,588 B2 | 2/2009 | Wong | |
| 8,024,369 B2 | 9/2011 | Pellegrini | |

(Continued)

FOREIGN PATENT DOCUMENTS

| | | |
|---|---|---|
| CN | 105069033 A | 6/2018 |
| CN | 111209407 A | 5/2020 |

(Continued)

OTHER PUBLICATIONS

"Segment Data Lakes Overview", Segment Documentation, downloaded from the Internet on Jul. 9, 2021, 8 pages, <https://segment.com/docs/connections/storage/data-lakes/>.

(Continued)

*Primary Examiner* — Kuen S Lu
(74) *Attorney, Agent, or Firm* — Stephen R. Yoder

(57) ABSTRACT

A method for creating a database for a domain specific application includes providing a centralized data repository comprising data from different sources, identifying a set of data units of the repository that represent a specific domain, determining a pivotal entity type for an application, determining a mapping between different identifiers of the pivotal entity type, creating a reference set by selecting a first subset of the set of data units using the mapping, wherein the first subset represents the pivotal entity type, selecting, based at least in part on the mapping, a second subset of the set of data units, wherein the second subset represents non-pivotal entity types which are related to instances of the pivotal entity type in the reference set; and creating a database from data units and associated attributes selected from the reference set of data units and the second subset of data units.

20 Claims, 14 Drawing Sheets

(56) References Cited

U.S. PATENT DOCUMENTS

| | | | |
|---|---|---|---|
| 8,392,460 | B2 | 3/2013 | Hoang |
| 8,560,568 | B2 | 10/2013 | Gilder |
| 9,128,782 | B2 | 9/2015 | Caplis |
| 9,372,922 | B2 | 6/2016 | Shaashua |
| 9,411,864 | B2 | 8/2016 | Glider |
| 9,639,406 | B2 | 5/2017 | Aggarwal |
| 9,740,757 | B1 | 8/2017 | Gilder |
| 9,846,731 | B2 | 12/2017 | McGrew |
| 10,042,911 | B2 | 8/2018 | Deshpande |
| 10,621,493 | B2 | 4/2020 | Oberhofer |
| 11,455,316 | B2 * | 9/2022 | Abdul Rasheed .... G06F 16/901 |
| 2003/0055747 | A1 * | 3/2003 | Carr ........................ G06Q 30/06 705/26.1 |
| 2006/0136466 | A1 | 6/2006 | Weiner |
| 2009/0012983 | A1 | 1/2009 | Senneville |
| 2017/0019487 | A1 * | 1/2017 | Maheshwari ....... G06F 16/9032 |
| 2018/0225345 | A1 | 8/2018 | Gilder |
| 2019/0317944 | A1 | 10/2019 | Deremigio |
| 2020/0250176 | A1 * | 8/2020 | Padmanabhan ......... G06F 16/27 |
| 2021/0133189 | A1 | 5/2021 | Prado |
| 2022/0019589 | A1 * | 1/2022 | May .................... G06F 16/2282 |

FOREIGN PATENT DOCUMENTS

| | | |
|---|---|---|
| CN | 111581299 A | 8/2020 |
| CN | 112364086 A | 2/2021 |
| EP | 0743781 A2 | 11/1996 |
| WO | 2018046399 A1 | 3/2018 |

OTHER PUBLICATIONS

Chen et al., "Exploiting relationships for object consolidation", IQIS 2005, Jun. 17, 2005, Baltimore, MD, USA, pp. 47-58.

Dey, Debabrata, "Record Matching In Data Warehouses: A Decision Model For Data Consolidation", Abstract Only, Operations Research, vol. 51, Issue 2, Published Online: Apr. 1, 2003, 16 pages, <https://pubsonline.informs.org/doi/abs/10.1287/opre.51.2.240.12779>.

Mell et al., "The NIST Definition of Cloud Computing", Recommendations of the National Institute of Standards and Technology, Special Publication 800-145, Sep. 2011, 7 pages.

"Patent Cooperation Treaty PCT Notification of Transmittal of the International Search Report and the Written Opinion of the International Searching Authority, or the Declaration", International application No. PCT/IB2022/060100, International filing date Oct. 20, 2022, dated Dec. 9, 2021, 6 pages.

* cited by examiner

PREPARING A DATABASE FOR A DOMAIN SPECIFIC APPLICATION USING A CENTRALIZED DATA REPOSITORY

BACKGROUND

The present invention relates generally to the field of digital computer systems, and more specifically, to a method for creating a database for a domain specific application.

Data preparation may be a fundamental stage of any data science project or an artificial intelligence (AI) application. A data scientist, data strategist or data engineer will usually need to identify relevant data sources, and explore, consolidate, and filter heterogeneous data sets. This process will result in the definition of the data scope for further development stages, like building AI models or applying tools for data enrichment, and ultimately for enabling an end user application.

SUMMARY

Various embodiments provide a method, computer system and computer program product as described by the subject matter of the independent claims. Advantageous embodiments are described in the dependent claims. Embodiments of the present invention can be freely combined with each other if they are not mutually exclusive.

In one aspect, the invention relates to a computer implemented method for creating a database for a domain specific application. The method comprises: providing, a centralized data repository comprising data from different sources, identifying a set of data units of the repository that represent a specific domain, determining a pivotal entity type for an application, determining, based at least in part on the set of data units, a mapping between different identifiers of the pivotal entity type, creating a reference set by selecting a first subset of the set of data units using the set of data units and the mapping, wherein the first subset of the set of data units represents the pivotal entity type, selecting, based at least in part on the mapping, a second subset of the set of data units, wherein the second subset of the set of data units represents non-pivotal entity types which are related to instances of the pivotal entity type in the reference set; and creating a database from data units and associated attributes selected from the reference set of data units and the second subset of data units.

In another aspect, the invention relates to a computer program product comprising a computer-readable storage medium having computer-readable program code embodied therewith, the computer-readable program code configured to implement all of the steps of the method according to preceding embodiments.

In another aspect, the invention relates to a computer system comprising one or more computer processors, one or more computer-readable storage media, and program instructions stored on the computer-readable storage media for execution by at least one of the one or more processors, the program instructions comprising instructions to implement all of the steps of the method according to preceding embodiments.

DETAILED DESCRIPTION

Figure 1:
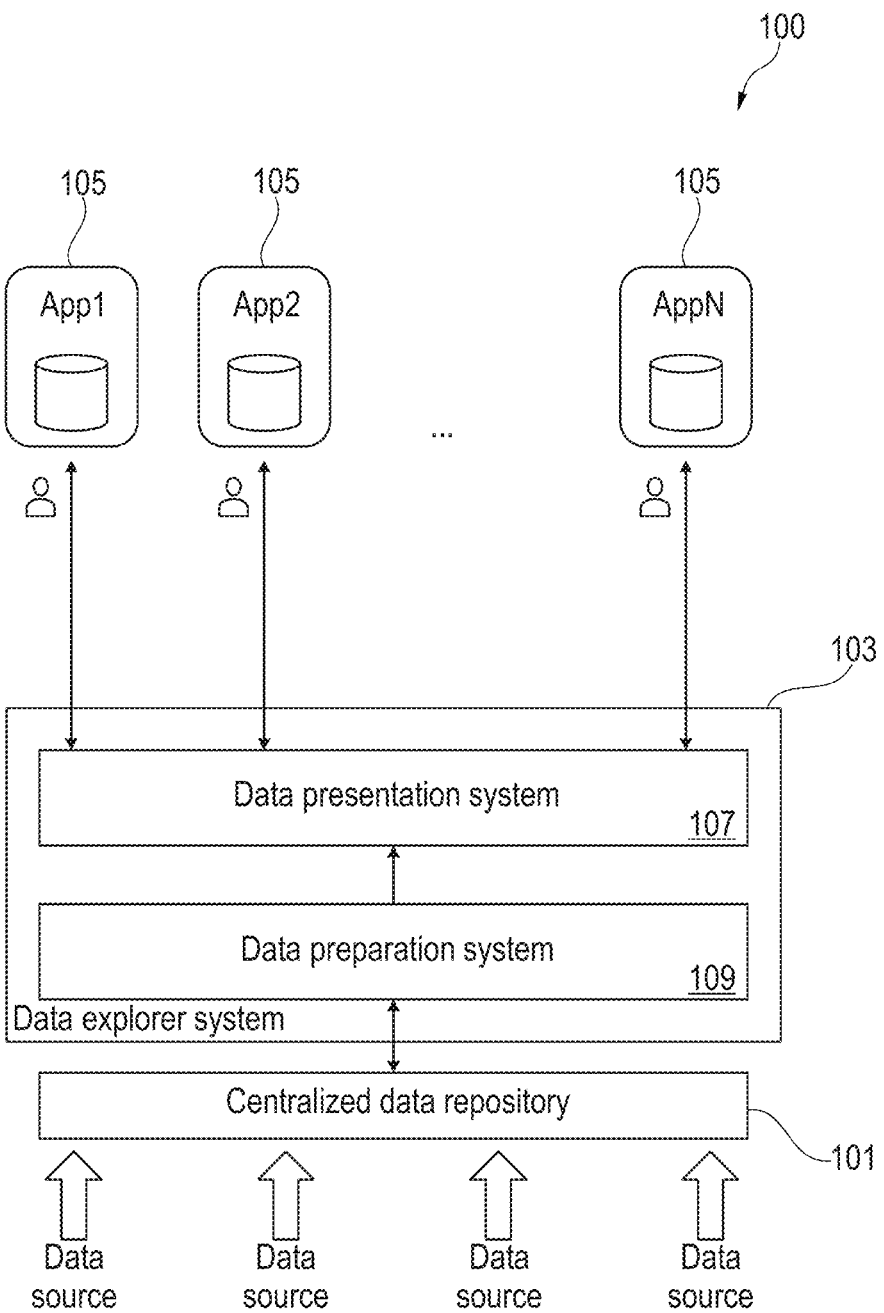
FIG. 1 is a block diagram of a computer system in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The centralized data repository may be a collection of data units. The data unit may be a table, record, column, or a combination thereof. The data units may be provided by different data sources. The data sources may be heterogeneous data sources. The centralized data repository may advantageously provide a large amount of data that represents different domains. The selection of the set of data units (also named initial set) of the centralized data repository that represents a specific domain may reduce the size of the data to be accessed and provide relevant information for the domain specific application. The domain specific application may be an application. The application may, for example, be a data analysis application. The specific domain of the application may be defined by a user or may automatically be selected from predefined domains. For example, a file associating each application type with a respective domain may be used to select the specific domain of the application. A domain represents concepts which belong to a realm of the world, such as biology or politics. The initial set of the centralized data repository that represent the specific domain may comprise data records and/or columns of the databases of the centralized data repository.

Although belonging to the same specific domain, the initial set may represent several different entity types which may not all be required by the application. For that, the pivotal entity type may be determined. The pivotal entity type may be the most significant entity type for the application. For example, the entity type "company" may be the pivotal entity type for financial applications and the entity type "contractor" may be the pivotal entity type for contractor applications. The pivotal entity type may, for example, be identified by a user such as a Subject Matter Expert (SME). The Subject Matter Expert may be a professional who identifies which data entities and relationships may be required to serve the objectives of the application.

Providing an application developer with a platform to build data scope in an intuitive and visual manner may be a technically challenging task. Due to the heterogeneity of the data sources, many different types of identifiers may represent the same entity type inside the initial set. This may introduce great difficulties to associate data originating from different data sources, as one database can describe an entity by an identifier that does not exist in another database. For example, a company may be identified by a "DUNS" number in one database and by an "S&P CapitalIQ ID" in another database. This may reduce the capability to develop applications that combine data across different databases and restrict the implemented functionalities within isolated "data islands" where the same identifier is used. Eventually this may lower the business value of the applications, as it may impose designs which either narrow or completely fail to meet the business goals. To overcome this issue, a mapping that maps the different identifiers of the same entity type may be provided. This mapping may enable to identify data units that represent the same entity type even if the entity type is represented by different identifiers. The mapping may, for example, be determined using an existing entity resolution software.

The mapping and the initial set may be used to select a reference set from the initial set. In one example, the mapping may be determined separately before the reference set is selected. In another example, the mapping may be determined in parallel to selecting the reference set from the initial set. The reference set comprises a first subset of the initial set that represent the pivotal entity type. For example, if the pivotal entity type is "company" the reference set may comprise records that represent the entity type "company" in the initial set. Since the mapping is used, the records that represent companies having mapped identifiers e.g., "DUNS" and "S&P CapitalIQ ID", may belong to the reference set.

The reference set may enable to perform most of the application. However, the application may require additional information related to the instances of the pivotal entity types. For example, the reference set may comprise information descriptive of a company X; however, the application may further need information related to employees of the company X which may not be present in the reference set. This may be solved by the second subset of data units (which is named non-reference set) that represent non-pivotal entity types which are related to instances of the pivotal entity type in the reference set.

Hence, the reference set and the non-reference set may provide a data segment of high application value, from which the user may select data units and attributes in order to create the database for an optimal execution of the application. A database is an organized collection of data, generally stored and accessed electronically from a computer system. In a relational database, the data is represented in terms of tuples grouped into relations according to the relational model. The primary key is a minimal set of one or more attributes (or columns) that uniquely specifies each tuple.

The present subject matter may enable an optimized pipeline that involves multiple data selection stages to select the initial set, the reference set, and the on-reference set. The data selection stages may, for example, be performed based on inputs from different kinds of experts, which progressively increase the relevance of data to the needs of each application. For example, subject matter experts may provide input to perform an initial assessment of the data lake contents and, together with a data strategist's input (or data engineer or data scientist), a segmentation of those contents may be performed, so that a data segment of the specific domain application may comprise at least the reference set and the non-reference set. Each data segment may be documented with technical and business descriptions which may enable the developer to quickly evaluate which segment satisfies better the needs of the application. The application developer can then work on the data segment to discover the contained data and select the exact data points that are important to the application. As a result, the data segmentation makes better use of the expertise and skills of different professionals and lowers the development time for the applications individually and in total because the same data segment can be beneficial for multiple applications. Additionally, the data segments can assist the governance and pricing policies. For example, a data explorer may equip the application developer with the tools needed to create an application specific view of the data from the data lake. Each view selects the subset of the data that is more relevant to the corresponding application and organizes them according to its scope. This may simplify the development of the application as the schema of the data can reflect the business logic more closely and it may also improve the response times due to the decreased amount of data to be searched. Additionally, the rules describing an application view can be materialized and stored, allowing to re-generate application specific data views at a later time. This can greatly facilitate data updates for the application. Secondly, the present subject matter may assist the endeavors to combine data across different data sources by providing the necessary associations or links across multiple unique identifiers. This may be achieved by utilizing record linkage (or Entity Resolution) techniques. Software packages can be used to generate mappings of values across different unique identifiers. Such mappings enable the application to seamlessly fuse data coming from heterogeneous databases. Hence, the present subject matter may enable an efficient discovering the data inside multi source data repositories such as a data lake. The significance of each data unit may be examined in relation to the goals of the application. A considerable amount of the development time may be saved by preventing the examination of irrelevant data or data of low application value. The present subject matter may provide customized views of the data which aim to better serve the application. The present subject matter may enable a protocol to discover, prepare and deliver application specific data out of all data e.g., existing inside a data lake. This may target the application developer and assist the efforts required to make use of the data inside the data lake for the purposes of a specific application. The present subject matter may enable to understand the data inside the data lake and identify which parts of it are relevant for the application.

According to one embodiment, a preparation phase comprises the identifying step, determining steps, creating of the reference set step, and the selecting step, and an application phase comprises the providing step, the receiving step, and the creating of the database step. Providing different phases may enable a flexible and thus efficient implementation of the present method, because the preparation phase and application phase may be executed independent of each other. The present subject matter may be advantageous as it may perform the preparation phase using inputs from a first set of users and perform the application phase by a second set of users. The first set of users may comprise SMEs and data strategists and the second set of users may include developers. For example, the first set of users may provide inputs to create data segments comprising at least the reference and the non-reference sets. The second set of users may make use of the created data segments to create databases for their applications. Thus, the present subject matter may not only improve convenience and ease of use from an application development point of view, but it may also enable reusage of large parts of application specific data-preparation work across unrelated teams and at the same time provide data in self-serving on-demand manner; hence, resulting in potential big cost savings.

According to one embodiment, the application phase is performed in real time. The preparation phase may be performed upfront offline. According to one embodiment, the method further comprises repeatedly performing the application phase. That is, for one preparation phase, multiple application phases may be performed; that is, the same reference set and the non-reference set may be provided multiple times so as to receive selections of data units to create respective databases. For example, a client-server configuration may be used to implement this embodiment, wherein a server may be configured to prepare the reference set and the non-reference set, while one or more clients may use the prepared reference and non-reference sets to create the respective database to execute their respective application. For example, the clients may connect to the server so that the application phase may be performed online, live or in real-time. This may be advantageous as it may save processing resources that would otherwise be required by repeated preparation of the reference set non-reference set each time a database of the application is to be created.

According to one embodiment, the preparation phase results in a data segment associated with the application. The data segment comprises the mapping, the reference set, and the non-reference set. In case the mapping is integrated within the reference set, the data segment may comprise the reference set and the non-reference set only. The method further comprises repeating the preparation phase for each further application, resulting in a data segment per application. In this case, step g) provides the reference set and the non-reference set of each of the data segments. The user may first select the data segment, before selecting the data units from the data segment in order to create the database. The data segment may be stored on a user system and can be used one or more times as described herein to create databases. The data segment may further be augmented with a documentation descriptive of the data segment. For example, the data segment may contain an extensive documentation about the application type domain with examples of relevant applications, descriptions of the contained data packages, the semantic of the data, the software code to build the data segments, etc.

Thus, the data segment may be a bundle containing domain-specific data, together with the tools that enable the development of an entity-centric application database. Organizing the data lake in data segments may provide many benefits for the application developer as follows.

The data segment documentation may be used to decide the relevance of the data to the purposes of the application under development.

The data segment documentation may enable to use the data packages to quickly focus on the most important data.

The data segment documentation may enable the use of the reference set to evaluate the "size" of the dataset or the extent at which the available data "cover" the application domain. This may be possible because the reference set may contain a complete list of all pivotal entity instances.

The data segment documentation may enable the use of indices as described below to discover metadata for all data packages inside the data segment.

The data segment documentation may enable to use the reference set and the indices to perform fast data comparisons and transformations on the pivotal attributes. This includes filtering, sampling, faceted search, compute distinct values on categorical attributes and statistics on numerical attributes, etc. Such operations may be possible because all indices may share pivotal attributes with the reference set and the values may be in the same normalized format.

The data segment documentation may enable to combine data from various data points without the limitations imposed by the different entity Identifiers. This is possible due to the record linkage mappings contained in the reference set, that allow joins across any identifier inside the data segment.

According to one embodiment, the method further comprises repeating the preparation phase and the application phase for a further application, thereby creating another database for the further application.

According to one embodiment, the method further comprises repeating, for another pivotal entity type, determining a mapping between identifiers of the pivotal entity type in case the identifiers are of different types, creating a reference set by selecting a first subset of the set of data units that represent the pivotal entity type using the set of data units, and using the mapping if the mapping is determined, selecting a second subset of the set of data units that represent non-pivotal entity types which are related to instances of the pivotal entity type in the reference set, the selecting being performed further using the mapping if the mapping is determined, providing the reference set and the second subset of data units, receiving a selection of data units and associated attributes in response to the providing, and creating a database from the selected units. This may enable to use the same initial set of the specific domain to perform different applications by selecting different pivotal entity types.

According to one embodiment, the method further comprises automatically updating the database according to a detected change in the centralized data repository. This may be enabled because the database is saved e.g., in a user sandbox. This embodiment may save resources that would otherwise be required to repeat the whole process for creation of the database if a change is occurred in the centralized data repository.

According to one embodiment, the method further comprises in response to detecting a change in the centralized data repository, updating according to the change the initial set, the mapping, the reference set, and the non-reference set. This embodiment may be advantageous in case further new databases may need to be created for the application. For example, the user may create at time t0 a database DB0 for one application. If the change occurs, only the database DB0 may be updated according to the previous embodiment; however, with this embodiment, the initial set, the mapping, the reference set, and the non-reference set are updated so that the user can create another database DB1 for the same application.

According to one embodiment, the determining of the pivotal entity type comprises determining a set of pivotal attributes of the pivotal entity type. The reference set comprises values of the set of pivotal attributes. The method further comprises: creating a first index that covers the set of pivotal attributes of all instances of the pivotal entity type in the reference set and the associated mapping; for each non-pivotal entity type, creating a second index covering attributes of the non-reference set that are semantically equivalent to the set of pivotal attributes, and using the first index and second indexes for retrieving the selected data units. For example, in response to detecting the change in the centralized data repository the indices may be updated.

According to one embodiment, the second index either covers values of the attributes from a selected source of the different sources or covers distinct values of the attributes.

According to one embodiment, the selection of the data units comprises: S1) applying a filter on one or more pivotal attributes of the pivotal entity type of the reference set, resulting in a filtered subset of the reference set, S2) dependent upon a size of the filtered subset, applying the filter on the selected data units or repeating steps S1) to S2). The filter may be tested on the reference set to determine how effective it is, e.g., in term of size reduction, and based on that it may be used to filter the selected data units. The filtered data may be used to create the database.

According to one embodiment, the method further comprises: grouping the non-reference set into data packages. Each data package represents a sub-domain of the domain, wherein the providing step comprises: displaying on a graphical user interface the data packages and the reference set, wherein the selection comprises a user interface operation (e.g., such as one or more drag and drop operations) to place data units into an area of the graphical user interface. The users may be able to browse through heterogeneous data sources, build data views based on field filtering and linking reference keys, and pull the resulting data package that fits the scope of their application.

According to one embodiment, the method further comprises generating an export query based on the received selection, executing the export query for creating the database, and saving the export query for further executions of the export query.

According to one embodiment, the method further comprises storing the database in a user sandbox. This embodiment may be advantageous as it may make use of existing sandboxes that are provided by the data lakes. Other storages may be used to store the created database.

According to one embodiment, the method further comprises executing the application using the database.

FIG. 1 is a diagram of a computer system 100 in accordance with an example of the present subject matter.

The computer system 100 comprises a centralized data repository 101, a data explorer system 103 and client systems 105. The client system 105 may comprise a computer system. The client systems 105 may communicate with the data explorer system 103 via a network connection which comprises, for example, a wireless local area network (WLAN) connection, WAN (Wide Area Network) connection, LAN (Local Area Network) connection the internet or a combination thereof. The data explorer system 103 may communicate with the centralized data repository 101 via a network connection which comprises, for example, a wireless local area network (WLAN) connection, WAN (Wide Area Network) connection, LAN (Local Area Network) connection the internet or a combination thereof. The data explorer system 103 comprises a data presentation system 107 and a data preparation system 109. The data explorer system 103 is configured according to the present subject matter for creation of databases for applications of the client systems 105.

The centralized data repository 101 may, for example, be a data lake. A data lake may be an enterprise data lake or enterprise data warehouse. The diversity and the amount of the available data in the data lake can benefit the development of applications which require access to multiple databases in order to serve their objectives. The centralized data repository 101 may comprise databases, wherein a database may contain data for many different types of entities like companies, clients, industries, products, offerings, people, securities, etc. Each record of the database may represent an instance of an entity type of these entity types. A data record or record may be a collection of related data items such as a name, date of birth and class of a particular entity. A record represents an entity instance, wherein an entity refers to a user, object, or concept about which information is stored in the record. The terms "data record" and "record" are interchangeably used.

As shown in FIG. 1, the centralized data repository 101 may be configured to receive data from different data sources. The data preparation system 109 may be configured to generate data segments for applications using the data of the centralized data repository. The data presentation system 107 may, for example, be configured to display a graphical user interface to help a user to create a database for his/her application.

Figure 2:
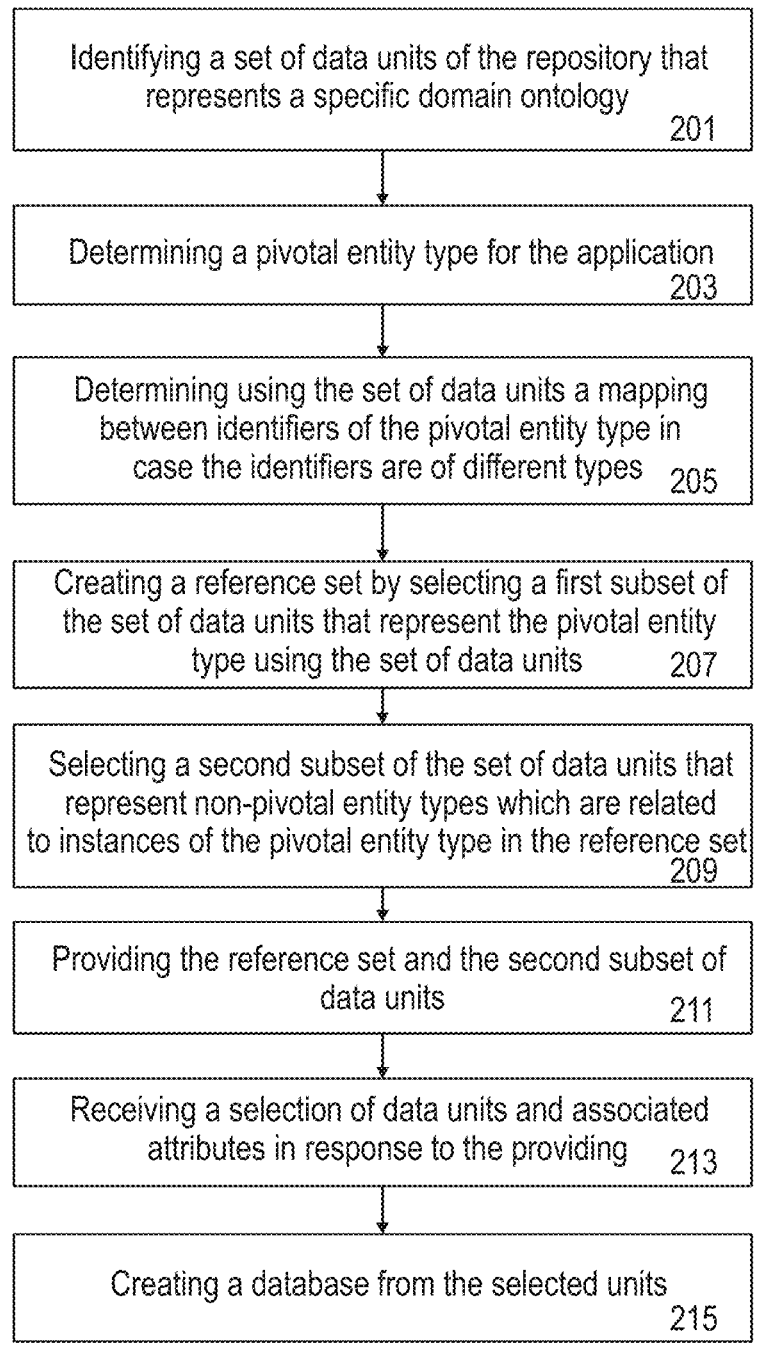
FIG. 2 is a flowchart of a method for creating a database for a domain specific application in accordance with an example of the present subject matter.

FIG. 2 is a flowchart of a method for creating a database for a domain specific application in accordance with an example of the present subject matter. For the purpose of explanation, the method described in FIG. 2 may be implemented in the system illustrated in FIG. 1, but is not limited to this implementation. The method may, for example, be performed by the data explorer system 103.

A set of data units (initial set) that represents a specific domain of the application may be identified or selected in step 201 from the centralized data repository 101. For example, the initial set may automatically be identified e.g., based on database names and/or table names that belong to the domain of the application. In another example, a user such as a subject matter expert (SME) may be prompted to provide an input indicating the initial set.

The initial set may, for example, further be organized into data packages, which specialize the scope of the application even more. The data package may be a collection of data units which focus on a certain subdomain e.g., as they have been identified by the SME. For example, a data package may focus on company financial operations and include tables like "Companies", "Revenue", "Products" etc. Another data package may focus on marketing operations, including tables like "Companies", "Offerings", or "Market Share". Both data packages could be part of the same data segment for a sales intelligence application. This hierarchical level of data organization may greatly assist the application developer to identify which data units are more relevant to the application.

The initial set may cover a high number of entity types which may not all be needed for analysis. For that, a pivotal entity type may be determined in step 203 for the application. For example, a list of entity types which are present in the initial set may be provided to the user who is prompted to select the pivotal entity type, which selection is then received in step 203. In another example, the pivotal entity type may automatically (e.g., randomly) be selected from the entity types of the initial set. This may enable an automatic execution of step 203. This may particularly be advantageous in case steps 203 to 209 of FIG. 2 are repeated multiple times for different pivotal entity types to cover all possible pivotal entity types.

Each instance of the pivotal entity type may be described by a unique entity identifier. However, the unique entity identifier may be of different types depending on the data source. The entity identifier may, for example, be the Data Universal Numbering System (DUNS), SAP Kundennummer, S&P CapitalIQ ID, International Securities Identification Number (ISIN), Social Security Number, etc. This may result in zero or more sets of records (named sets of related records), wherein each set of related records represents the same instance of the pivotal entity type but have different identifiers. If the one or more sets of related records exist, for each set of related records, a mapping between the different identifiers of the set of related records may be determined in step 205 using the initial set. The mapping may be a record linkage mapping that is an integral part of the reference set. Indeed, the record linkage of a set of related records may create a single golden record that comprises the mapped identifiers. The mapping may, for example, be produced by an Entity Resolution Software (e.g., the initial set and the pivotal entity type may be provided in step 205 as input to the Entity Resolution Software and the mapping may be received from the Entity Resolution Software).

A reference set may be created in step 207 by selecting a first subset of the initial set that represents the pivotal entity type using the initial set. If, for example, the initial set is organized in data packages, part of the packages or all of the data packages may be queried in order to select the first subset of data units. The part of the data packages to be queried may, for example, be selected based on the subdomains they cover (e.g., a user may be prompted to select that part of data packages). Querying only part of the data packages may save resources compared to querying all the packages and may provide more accurate or focused results based on desired subdomains. The reference set may provide a data collection of all pivotal entity instances inside a domain specific data segment. If, for example, the pivotal entity type is "company", the reference set may comprise records descriptive of different companies. In one example, steps 205 and 207 may be performed in parallel so that the mapping is provided as an integral part of the reference set; that is, the reference record may comprise the mapped identifiers that represent the instance of the pivotal entity of said reference record.

Figure 7:
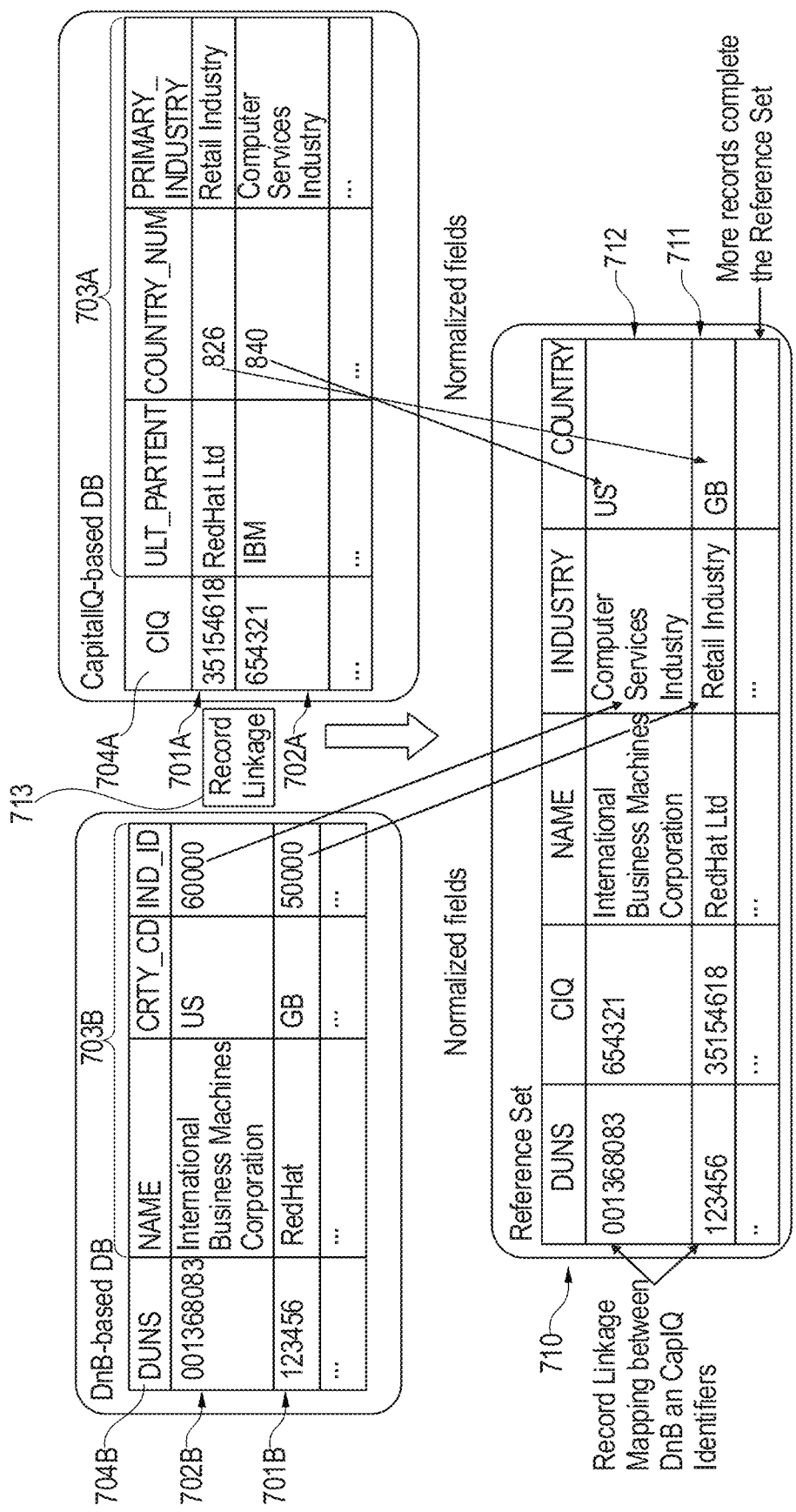
FIG. 7 is a diagram illustrating a method for augmenting a reference set with identifier mapping according to an example of the present subject matter.

The created reference set may comprise records (named reference records), having a set of attributes (named set of reference attributes). The set of reference attributes comprises one or more entity identifiers and entity attributes. The reference records may be provided using the sets of related records and additional other records (named unique records) that represent unique instances of the pivotal entity type respectively. For example, each set of related records may be represented by one golden record (e.g., they may be merged into the golden record e.g., as shown in FIG. 7) in the reference set, wherein the set of reference attributes of said golden record comprises mapped identifiers of the set of related records in addition to the entity attributes. Thus, the reference records may comprise the golden records and the unique records.

The reference records may originate from different data sources, wherein each data source may use its own set of entity attributes to describe the pivotal entity type. In one example, the entity attributes of the reference records may comprise all distinct attributes of the sets of entity attributes provided by the different data sources. In another example, the entity attributes of the reference records may comprise a selected set of pivotal entity attributes (e.g., values which may be provided by all data sources).

The reference set may further be processed. The processing of the reference set may comprise data transformations like consolidating attribute names, converting data formats, changing levels of aggregation etc. This may transform heterogeneous data into a state that may allow application specific evaluation.

The reference set may, for example, be provided as one table having columns representing the set of reference attributes.

A second subset of data units may be selected in step 209 from the initial set. The second subset of data units represent non-pivotal entity types which are related to instances of the pivotal entity type in the reference set. For example, for each unique reference record, the identifier ID of the reference record may be used to query the initial set in order to select records that represent a non-pivotal entity type and comprises said identifier ID. In addition, if the mapping is determined in step 205, the mapping may be used in step 209 for selecting the non-reference set; for example, if a reference record (the golden record) has identifiers ID1 and ID2, records that have ID1 or ID2 and represent a non-pivotal entity type may be selected. The second subset of data units may be referred to as non-reference set.

The non-reference set may, for example, be split into subsets each associated with a distinct non-pivotal entity type, wherein each subset comprises one or more tables, wherein each table has a respective set of attributes (named set of non-reference attributes). Thus, the non-reference set may comprise multiple sets of non-reference attributes associated with respective tables. For example, if the non-reference set comprises one employee table and one contract table, the employee table may form a subset and the contract table may form another subset. The employee table has its own set of non-reference attributes and the contract table has its own set of non-reference attributes. Thus, in this case the non-reference set has two sets of non-reference attributes.

The non-reference set may be advantageous as the information present in the reference set may not be sufficient to execute the application. The non-reference set may enable access to additional records that represent non-pivotal entity types, where those records are linked to or associated with instances of the pivotal entity type in the reference set. For example, if the reference set comprises a record descriptive of company "X", the additional records may, for example, relate to other entities such as employees of the company "X". In this case, the application may have access to attributes of the first record about company "X" but also to attributes of the employees of the company "X".

The reference set and the non-reference set may be provided in step 211. The provision of the reference set and the non-reference set may automatically be performed or may be performed on request e.g., the request may be a request of data in order to create a database for the application. For example, a graphical user interface may be displayed. The graphical user interface comprises user interface elements (e.g., icons) representing the reference set and subsets of the non-reference set respectively. The user interface elements may indicate the set of reference attributes of the reference set and the sets of non-reference attributes of the non-reference set. For example, by moving a mouse cursor on the user interface element associated with the reference set, the set of reference attributes of the reference set may be displayed.

In response to the providing of the reference set and the non-reference set, a selection of data units and associated attributes may be received in step 213. For example, one or more tables of the reference set and the non-reference set may be selected, wherein in each selected table a subset of attributes or all attributes of the selected table may be selected. The selection may, for example, be performed on the graphical user interface. A database may be created in step 215 from the selected units. For example, an export query may be generated based on the received selection on the graphical user interface, and the export query may be executed for creating the database.

Steps 201 to 209 may, for example, be performed by the data preparation system 109 to prepare a data segment for the application, wherein the data segment comprises the reference set and the non-reference. Steps 201 to 209 may be repeated to provide other data segments for other applications respectively. In one example, the data segment may be augmented with indices representing the reference set and the non-reference set. The indices may facilitate the search. The indices may comprise a first index that covers the set of reference attributes of all reference records in the reference set. For each set of non-reference attributes of the multiple sets of non-reference attributes, a second index may be created, wherein the second index covers attributes of said set of non-reference attributes which are semantically equivalent to the entity attributes of the reference set. The data segment may be provided to the data presentation system 107 to perform steps 211 to 215.

Figure 3:
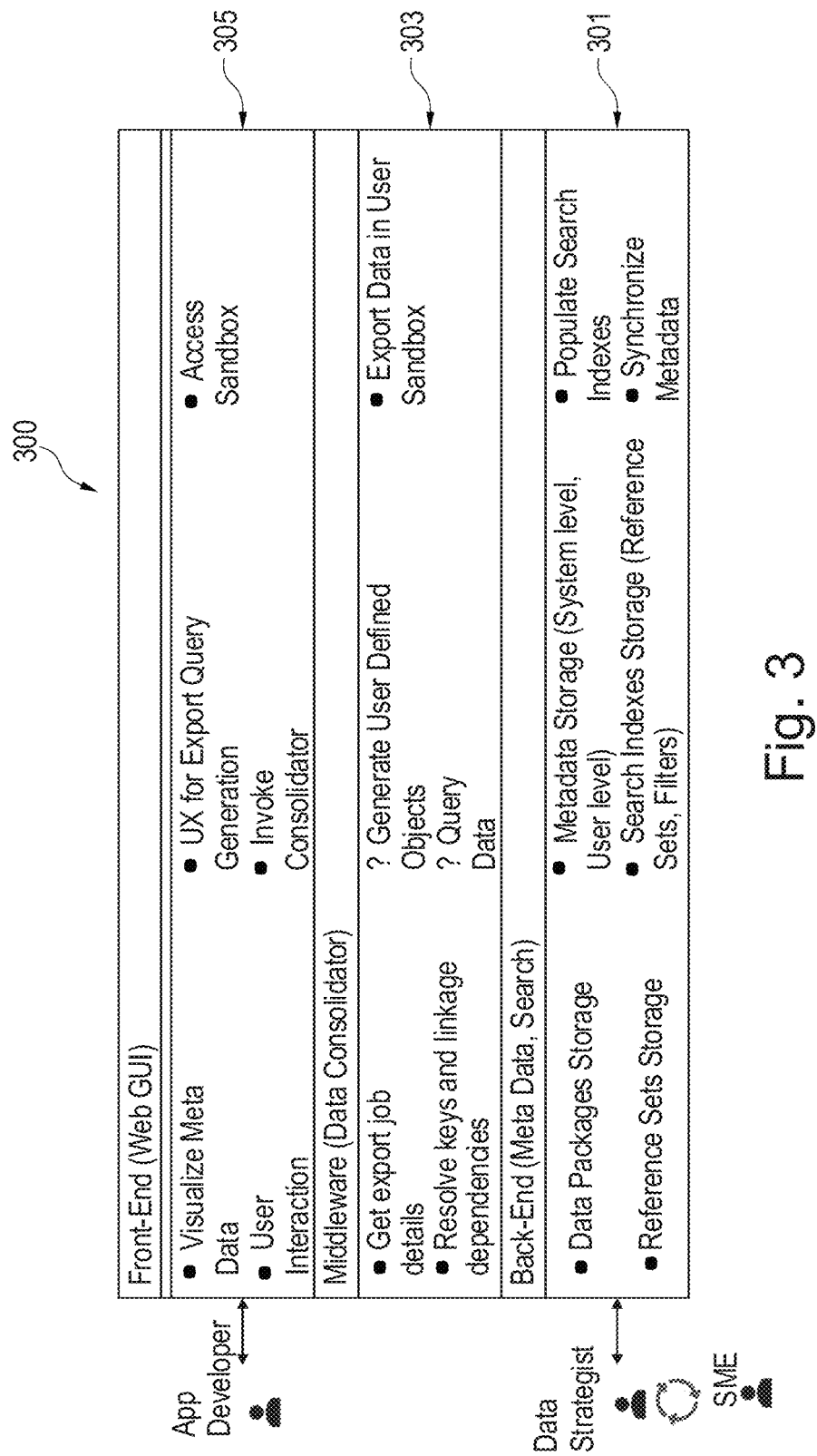
FIG. 3 is a diagram of a data explorer system in accordance with an example of the present subject matter.

FIG. 3 is a diagram of a data explorer system in accordance with an example of the present subject matter. The data explorer system 300 may enable a 3-tier application which has a back-end component 301 to store meta data and indices for fast search, a middleware component 303 to consolidate data and a front-end web-based user interface 305. The back-end component 301 may be configured to define and store the reference sets, system level metadata and user level metadata, and the non-reference sets. The non-reference sets may be stored as packages. The back-end component 301 may further be configured for populating and storing the search indices and synchronizing metadata. The middleware component 303 may be configured to consolidate data by, for example, generating user defined objects, exporting data in user sandbox, querying the stored data, etc. The front-end web-based user interface 305 may enable access to the sandbox, invoking the consolidator and visualization of metadata, wherein the visualized metadata may comprise the reference and non-reference sets. The components 303 and 305 may, for example, be part of the data presentation system 107 of FIG. 1, while component 301 may be part of the data preparation system 109 of FIG. 1.

Figure 4:
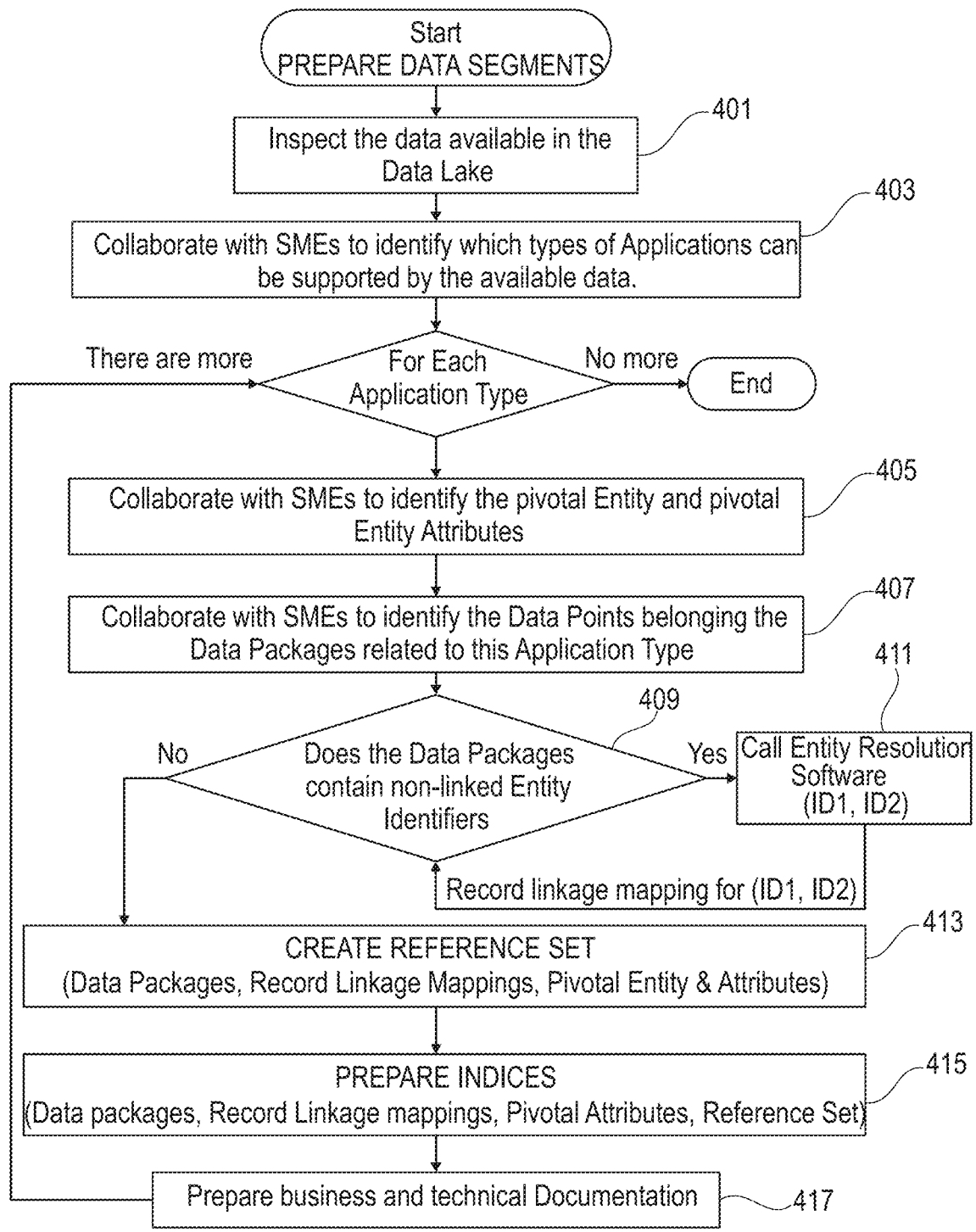
FIG. 4 is a flowchart of a method for preparing data segments from a data lake in accordance with an example of the present subject matter.
Figure 5:
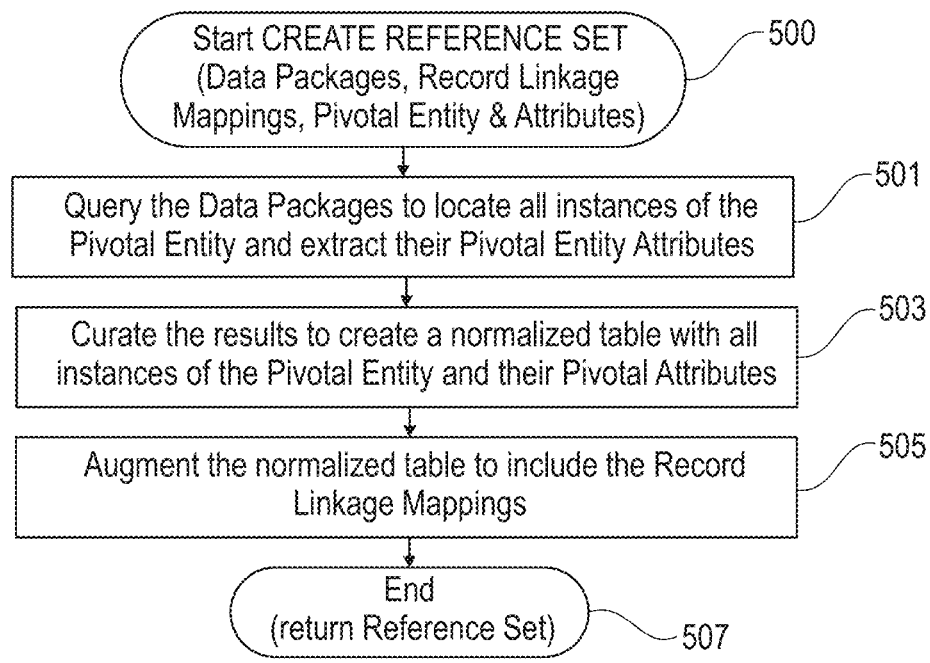
FIG. 5 is a flowchart of a method for creating a reference set in accordance with an example of the present subject matter.
Figure 6:
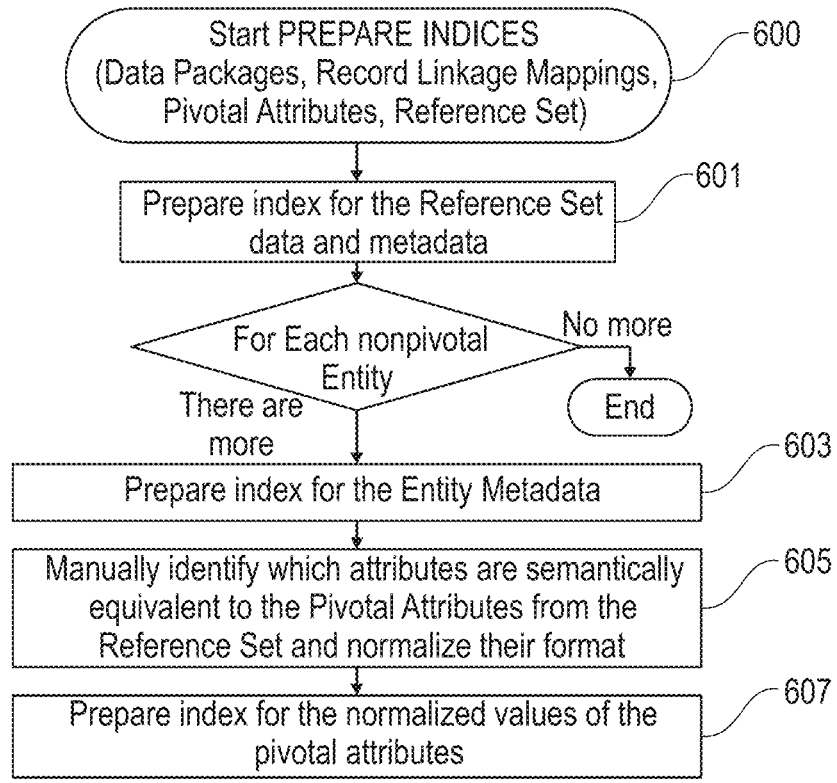
FIG. 6 is a flowchart of a method for creating indices in accordance with an example of the present subject matter.

FIG. 4 is a flowchart of a method for preparing data segments from a data lake in accordance with an example of the present subject matter. The data available in the data lake may be inspected in step 401. An input from one or more SMEs may be used to identify in step 403 which types of applications can be supported by the available data. For each one of the identified application types, steps 405 to 417 are executed. An input from one or more SMEs may be used to identify in step 405 a pivotal entity type and a set of pivotal entity attributes for the application type. An input from one or more SMEs may be used to locate in step 407 the data units relevant to the application type and organize them in data packages. The data units relevant to the application may comprise records of non-pivotal entity types which are linked to the pivotal entity type. It may be checked in step 409 if the entity resolution software may be called to create mappings between entity identifiers contained in the data packages. In particular, it may be determined in step 409 whether the data packages contain non-linked entity identifiers. If the data packages contain non-linked entity identifiers, the Entity Resolution software may be called in step 411; otherwise, the reference set may be created in step 413 using the data packages, record linkage mappings (if determined), pivotal entity type, and the set of pivotal entity attributes. FIG. 5 provides an example implementation of step 413. Indices may be prepared in step 415 by, for example, invoking a "prepare indices procedure" with the parameters "Data Packages, Record Linkage Mappings, Pivotal Entity Attributes, Reference Set". FIG. 6 describes the prepare indices procedure. The data segment may comprise the reference set, data points of step 407 and the prepared indices. Technical and business documentation may be provided in step 417 for the created data segment.

FIG. 5 is a flowchart of a method for creating a reference set in accordance with an example of the present subject matter. The method of FIG. 5 may receive as input in step 500 parameters, data packages, record linkage mappings, pivotal entity, and pivotal entity attributes. The data packages may be queried in step 501 to locate all instances of the pivotal entity and extract their pivotal entity attributes. The results of this query can return instances of the pivotal entity in diverse formats or instances that are described by different entity identifiers. The returned results may be curated in step 503 in order to prepare a normalized table with all instances of the pivotal entity within the data segment. Each pivotal entity instance contains all pivotal attributes in a normalized format. The normalization process may manually be curated with the help of the Record Linkage Mappings, Data Exploratory Analysis, and additional data transformations. The normalized table may be augmented in step 505 with the Record Linkage Mappings. This may allow each pivotal instance to be referenced by all Entity Identifiers which are contained in the data segment. The last step completes the creation of the reference set for the data segment. The reference set may be provided in step 507.

FIG. 6 is a flowchart of a method for creating indices in accordance with an example of the present subject matter. The indices may be created to augment the data segment of the application. The method of FIG. 6 receives as input in step 600 data packages, record linkage mappings, pivotal attributes, and a reference set. The indices may comprise an index of the reference set. This index covers all pivotal attributes and record linkage mappings for all pivotal entities inside the data segment. For the remaining entities inside the data segment, indices may cover only those attributes that are semantically equivalent to the pivotal attributes contained in the reference set. The index may be prepared in step 601 for the reference set. This index covers all pivotal attributes and record linkage mappings for all pivotal entities inside the data segment. For each non-pivotal entity inside the data segment steps 603 to 607 may be performed. An index may be prepared in step 603 for the entity metadata. Step 605 may include identifying, manually, which entity attributes are semantically equivalent to the pivotal attributes contained in the reference set, and the format of these entity attributes may be normalized. An index may be created in step 607 for all instances of the non-pivotal entity but only for the normalized attributes prepared in the previous step. The last step completes the creation of all required indices for the data segment.

FIG. 7 is a diagram illustrating a method for augmenting a reference set with identifier mapping according to an example of the present subject matter.

Two sets of related records of the reference set may be provided. The first set of related records comprises records representing, for example, Company A (Co. A) and the second set of related records comprises records representing, for example, Company B (Co. B). The first set of related records comprises records 701A and 701B which are provided by different data sources. As indicated in FIG. 7, the record 701A belongs to a CapitalIQ-based database while the record 701B belongs to a DnB-based database. The record 701A uses a CapitalIQ identifier 704A to represent Company A while the record 701B uses the DUNS 704B to represent Company A. Although presented in different format, the two records 701A and 701B have the same entity attributes values 703A and 703B.

Similarly, the second set of related records comprises records 702A and 702B which are provided by different data sources. As indicated in FIG. 7, the record 702A belongs to a CapitalIQ-based database while the record 702B belongs to a DnB-based database. The record 702A uses a CapitalIQ identifier 704A to represent Company B while the record 702B uses the DUNS 704B to represent Company B.

A pre-computed record linkage mappings 713 may be used to augment the reference set 710 and provide alternative identifiers. As shown in FIG. 7, the related records 701A and 701B are merged to form a single record 711 and the related records 702A and 702B are merged to form a single record 712. The single records comprise the alternative identifiers 704A and 704B in addition to the entity attribute values.

Figure 8A:
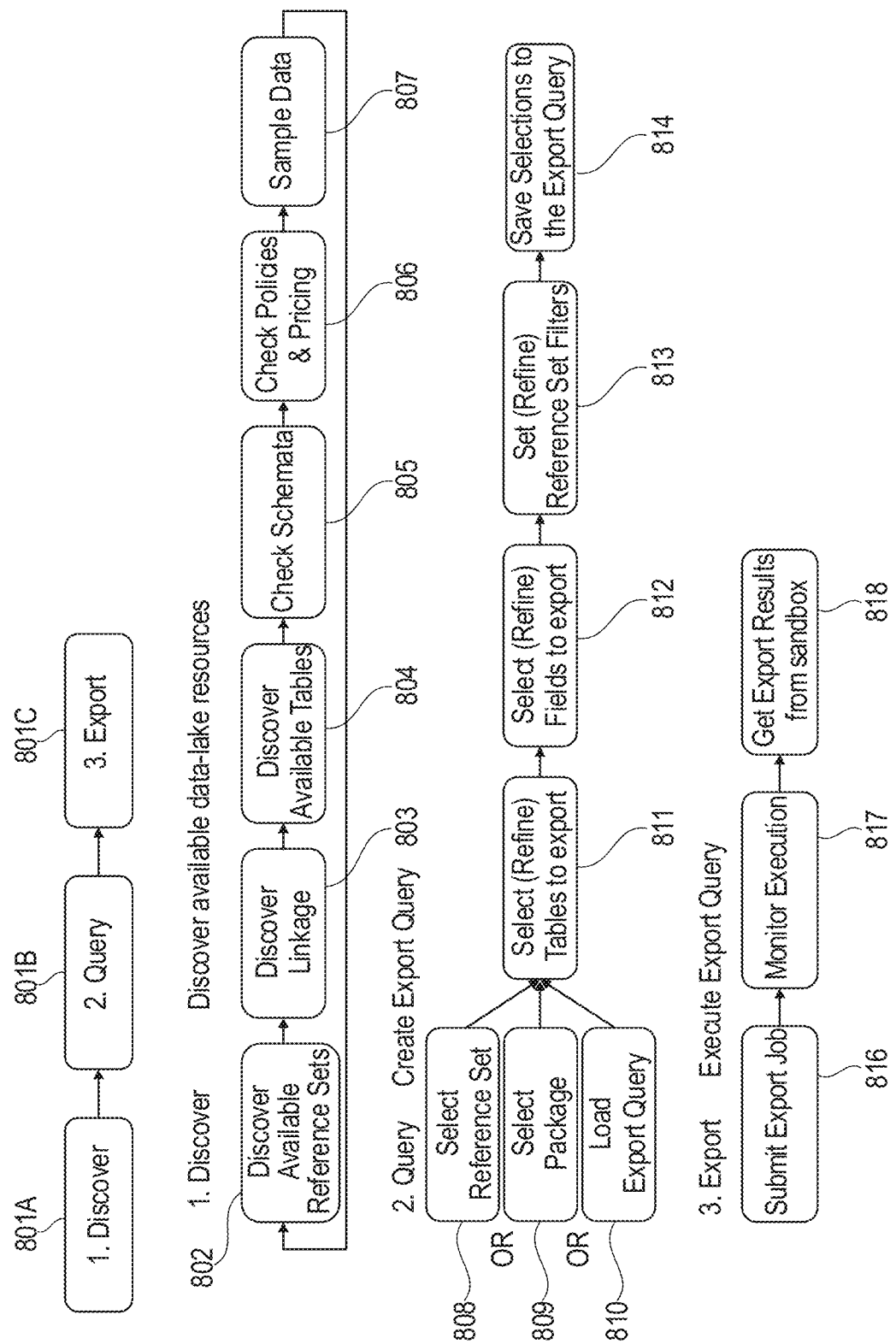
FIG. 8A is a diagram illustrating an example method for creating a database for an application using a data segment of the application.
Figure 8B:
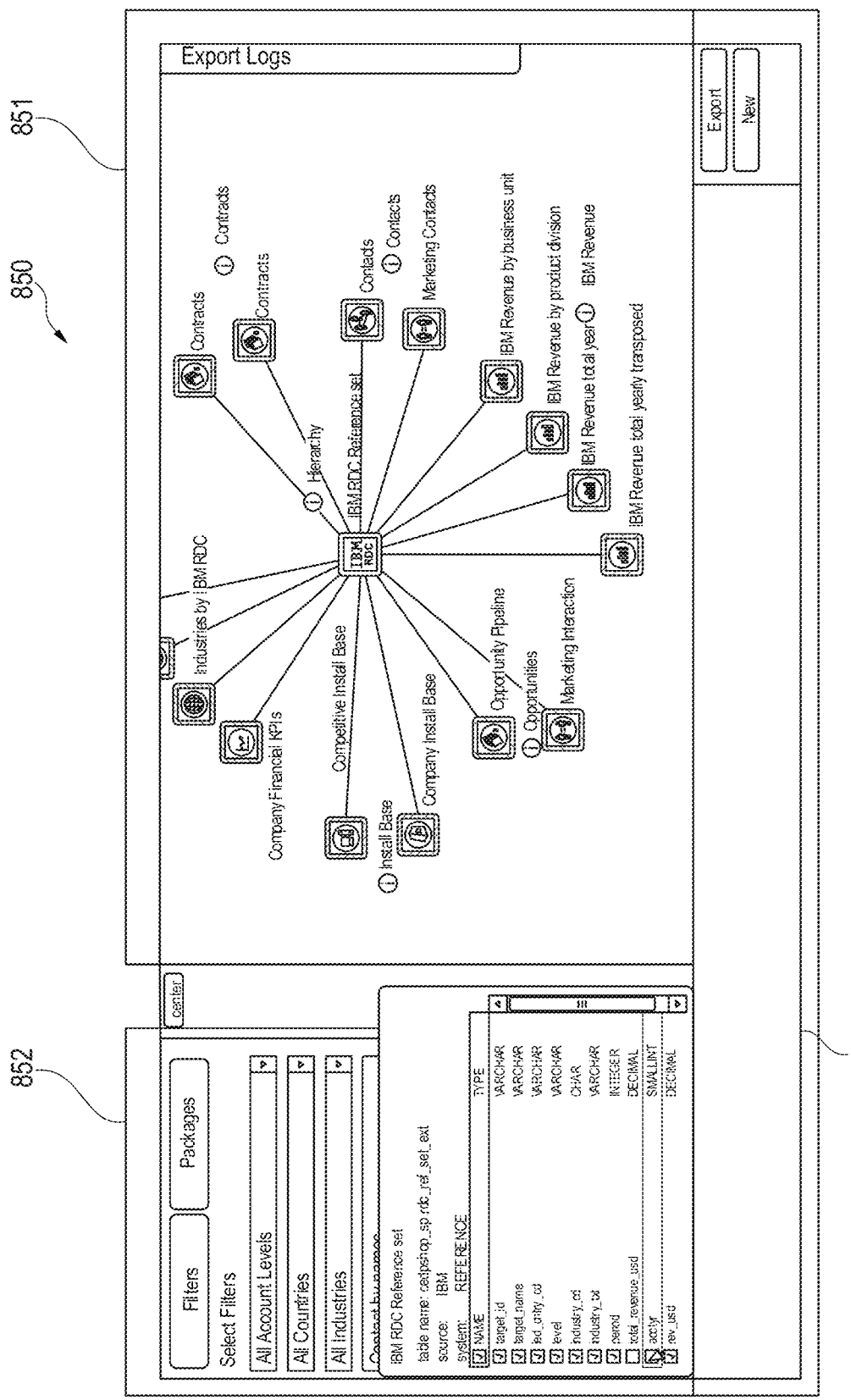
FIG. 8B depicts the status of a graphical user interface at the discovery stage.
Figure 8C:
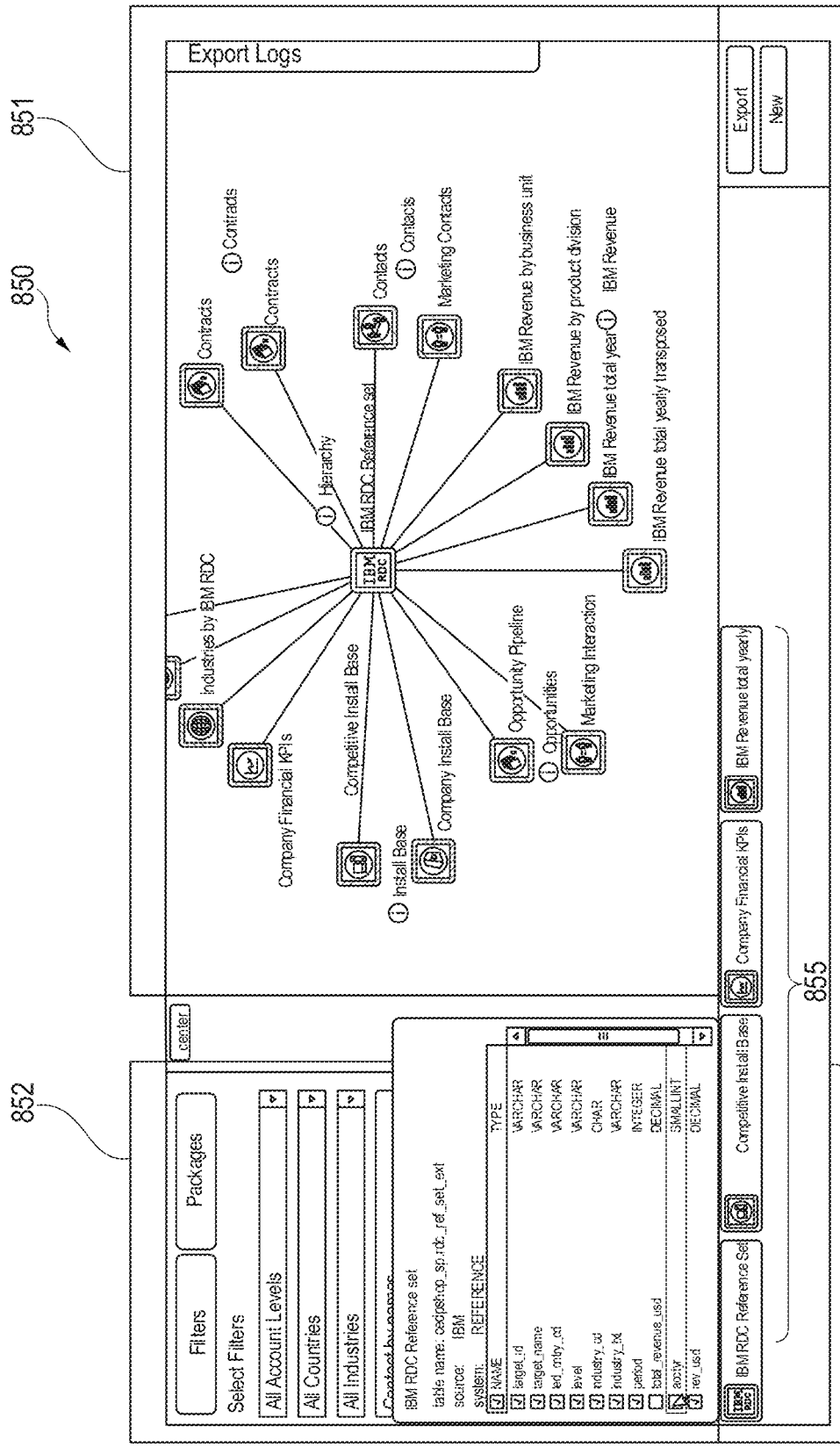
FIG. 8C depicts the status of the graphical user interface at the query stage.
Figure 8D:
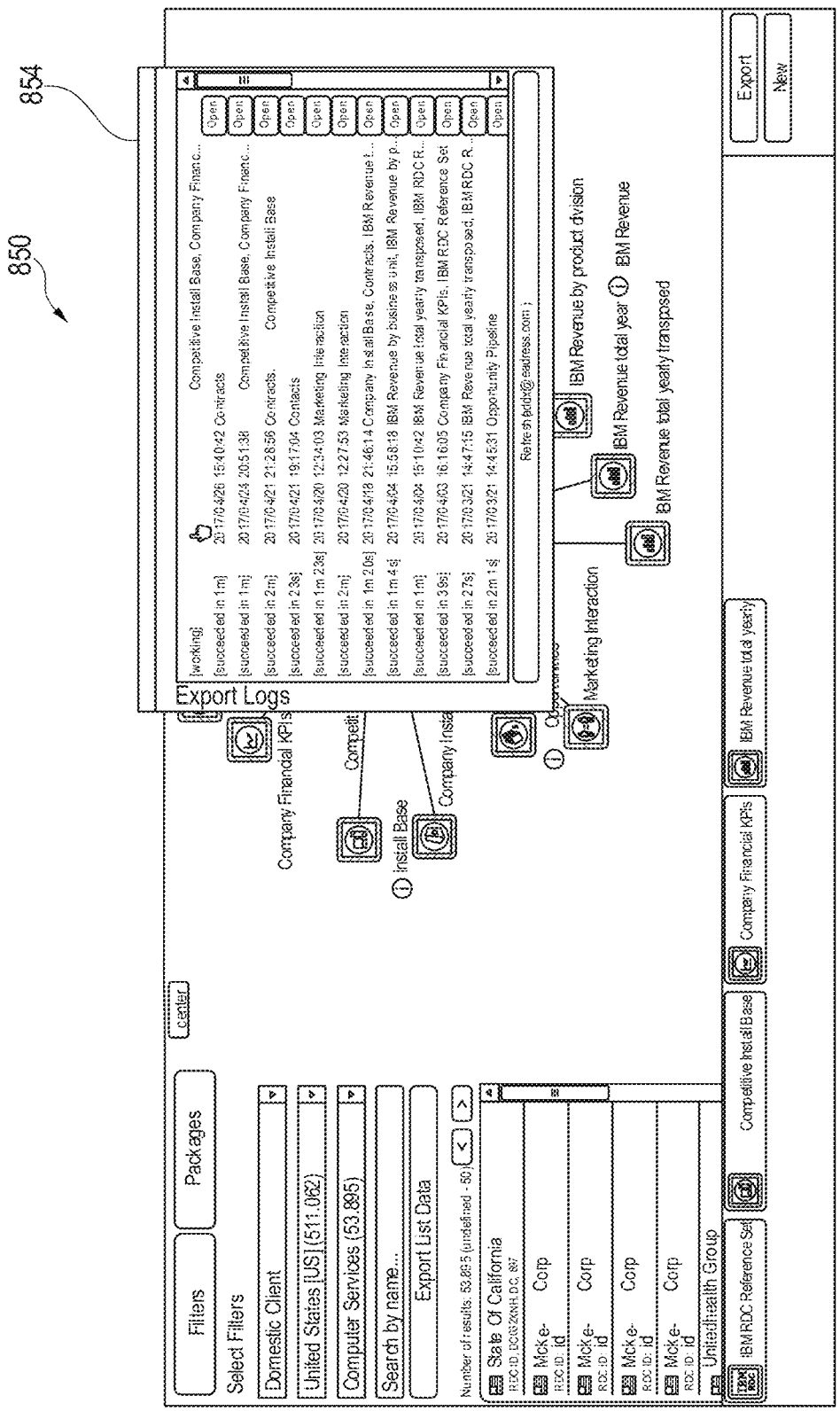
FIG. 8D depicts the status of the graphical user interface at the export stage.

FIG. 8A is a diagram illustrating an example method for creating a database for an application using a data segment of the application. A user interface 850 (such as the web-based user interface 305) as shown in FIGS. 8B-D may be used as an entry point for the application developer to find the required data for the application. The user interface 850 enables three activities in order to create the database in the following flow: discovering activity 801A, querying activity 801B, and exporting activity 801C. FIGS. 8C-8D shows the status of the user interface 850 for the three activities 801A-801C respectively. To support this flow, the user interface 850 may be divided into several areas such as a data graph area 851, export area 853, filtering area 852 and export log area 854. The method of FIGS. 8A-8D provides an example implementation using a user interface but it is not limited to, as the skilled person in the art may use other means to interact with the application developer in order to perform the activities 801A, 801B and 801C.

The discovering activity 801A may comprise user experience methods 802 to 807. The user interface 850 provides an overview visualization across all the data segments in the data graph area 851 of the user interface 850. From that visualization, the user can discover (802) the available data lake resources. By picking a particular data segment that corresponds to their application, the user can see as shown in FIG. 8B, in a graphical form, a "constellation" of related resources in the data graph area 851. The content of the user interface 850 is provided for exemplification purpose only and not intended to be limited thereto. This consists of the tables of the non-reference set and the reference set, interconnected with a representation of the available linkage. There is a functionality to access information about the data segment, its reference set, and tables. The user may be presented with documentation about given resources, usage policy and pricing information. For tables, the user can check metadata and sample the data to see exact information values contained in the fields. Additionally, descriptive statistics may be provided such as min/max boundaries or averages for numerical values or a list of the most common distinct values for categorical string fields. All these user experience methods 802 to 807 create an environment that may ease content understanding and stimulates discovery of new data. As users find new resources and get familiar with the content, they can begin to shape application specific requirements for the data and form the export query.

The querying activity 801B may be performed as follows. The user interface 850 may be used to select the reference set (808) and/or select a package (809) of the non-reference set. The selection of step 808 or 809 may involve the steps 811 to 814. After discovering available resources using the user experience methods 802 to 807, the application developer may use easy-to-use visual tools to form a "shopping basket" of application specific data lake resources. The user can export those resources for further application development. In the user interface 850 this may be achieved by drag-and-dropping tables from the data graph area 851 into the export area 853. As shown in FIG. 8C, the export area 853 comprises the selected tables 855. The scope of the data in selected resources can be set in the filtering area 852, where the user can see a list of the pivotal entity attributes. These attributes can be used to filter the data. By selecting (811-812) resources and applying filtering (813) the user defines a visual representation of an export query. The user interface 850 may show a list of results with example names and their number. The user can also opt to load (810) previously saved (executed) export queries by selecting it from the export log area 854 or select a pre-configured data package. Whichever the scenario is, the user can then proceed to refine table selection (811), refine schema by selecting required fields (812), and tune the filters (813). The newly created or refined query can then be saved (814) in the system.

The exporting activity 801C may be performed as follows. After defining the export query, it can then be submitted (816) for execution. The system provides the ability to monitor (817) the execution status in the export log area 854 and, after completion, it provides the link and/or credentials to the user sandbox where all exported data is located so that the user can get (818) export results from the sandbox.

Figure 9:
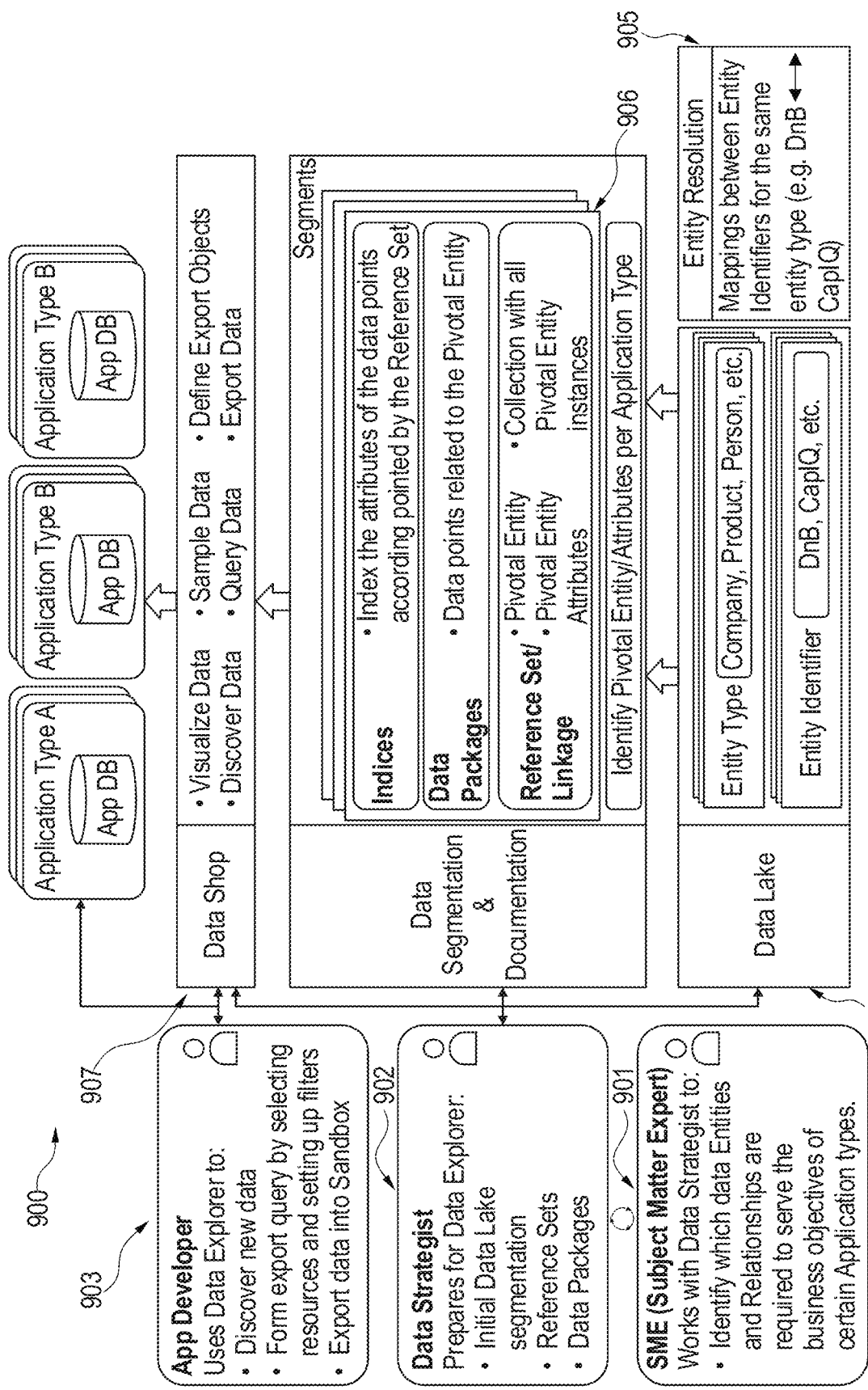
FIG. 9 is an architecture block-diagram of a data explorer concept in accordance with the present subject matter.

FIG. 9 is an architecture block-diagram 900 of a data explorer concept in accordance with an example of the present subject matter. The data explorer concept may be implemented in the data explorer platform 300 described with reference to FIG. 3. Personas taking part in the platform comprise a subject matter expert (SME) 901 who works in close collaboration with a data strategist 902. Personas further comprise an application developer 903 who is the user of the data explorer platform 300.

The architecture block-diagram 900 comprises a block of a data lake 904. The data lake 904 is as a collection of various entity types (e.g. Company, Product, Person, etc.).

And each entity type can be described by different entity identifiers (e.g. DnB, CapIQ, etc.). The architecture block-diagram 900 further comprises a block representing an entity resolution software 905 which can generate record linkage mappings between entity instances described by different identifiers.

The subject matter expert 901 may perform an initial assessment of the data lake contents and, together with the data strategist 902 they implement a segmentation of those contents. As shown in FIG. 9, each data segment 906 is a bundle containing domain-specific data, together with the tools that enable the development of an entity-centric application database App DB of the application A, B, or C. The SME 901 may select the data points which are most relevant to the domain of the data segment 906 and the selected data points are further organized into data packages, which specialize the scope of the data segment even more. The user e.g., application developer, may use user interface tools 907 to discover data, select data, and define queries to create the entity-centric application database App DB. The SMEs may select the data points which are most relevant to the domain of the data segment. The selected data points may further be organized into data packages, which specialize the scope of the data segment even more. This hierarchical level of data organization may greatly assist the efforts of the application developer to identify which data points are more relevant to the application under development. The record linkage mappings may be an integral part of a data segment. Their goal may be to overcome the isolated data islands problem caused by heterogeneous entity identifiers. The data strategist may identify all entity identifiers present in the data segment and uses an entity resolution software to create mappings between them. These mappings may be used to enable joins across data points that use different identifiers. The SMEs may enable to correctly identify the pivotal entity and the pivotal entity attributes inside a data segment. By definition, the pivotal entity is the most significant entity in the data segment, and it may specially be relevant for building entity-centric applications. Therefore, a reference set may be prepared around the pivotal entity and pivotal attributes as follows: St1) a complete list of all instances of the pivotal entity appearing in the data segment may be provided. St2) each entry of the list is described by normalized pivotal entity attributes. This step St2 may involve manual curation of the pivotal attribute values in order to bring them in a normalized format regardless of which data source provides the data. St3) in case the data segment contains multiple types of entity identifiers, the pre-computed record linkage mappings are used to augment the reference set and provide alternative identifiers. Additionally, the data strategist, in collaboration with the SMEs, may prepare indices for all non-pivotal entities of the data segment. Each index contains: metadata for all entity attributes, the identifier for each entity instance and normalized values for those attributes that are semantically equivalent to the pivotal attributes in the reference set. The determination of the semantically equivalent attributes may involve the following manual tasks: determining which attributes match semantically to the pivotal entity attributes; defining how to consolidate the attributes collected in the previous step that match the sample pivotal entity attribute. This may include decisions like choosing only the values of the attribute from the most reliable data source or collecting all distinct values. For the attributes collected at the first determining step, their values may be converted into the normalized format as in the reference set, in particular, the data type and unit.

Figure 10:
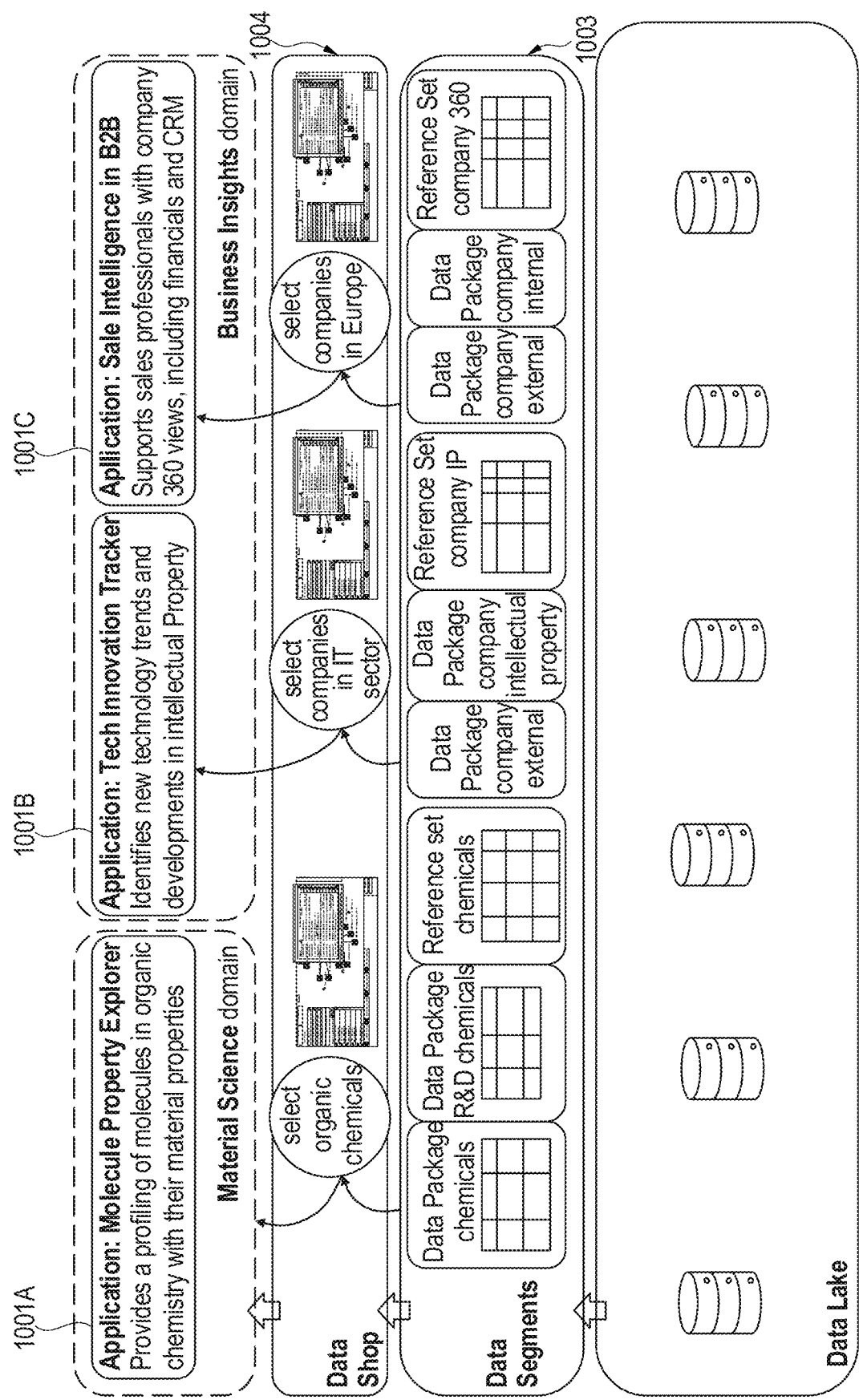
FIG. 10 illustrates an example of the database creation for three different applications.

FIG. 10 illustrates an example of the database creation for three different applications 1001A-1001C. The applications 1001A-1001C comprise a molecule property application 1001A from the material sciences domain. The applications further comprise two applications from the business insight domain. Namely, a tech innovation tracker application 1001B and an application 1001C for sales intelligence in B2B.

A data lake 1002 comprises, for example, various types of data which may be used for these three applications like databases for: chemicals, patents, scientific articles, financials, companies, sales, and marketing. Even though the application developer may have full access to all these data, additional support from SMEs may be required in order to understand of their semantics, the data sources, or the logical data models in the data repositories.

The data explorer system is represented by the blocks 1002, 1003 and 1004. As shown in FIG. 10 in block 1003, three different data segments are created (each data segment comprises a reference set and related data packages) using the data explorer system: chemicals with pivotal entity "Molecule", company IP with pivotal entity "External Company", company 360 with pivotal entity "External Company".

The developers of each application can use the data shop 1004 of the data explorer system to discover, query and export the pre-processed data packages to create an application specific database. The data explorer may greatly optimize the development of such application specific database because the application developer can: 1) use the data segment documentation to decide the relevance of the data to the purposes of the application under development, 2) use the data packages to quickly focus on the most important data, 3) use the reference set to evaluate the "size" of the dataset or the extent at which the available data "cover" the application domain, 4) use the indices to discover metadata for all data packages inside the data segment, 5) use the reference set and the indices to perform fast data comparisons and transformations on the pivotal attributes (filtering, sampling, faceted search, compute distinct values on categorical attributes and statistics on numerical attributes, etc.), such operations are possible because all indices share pivotal attributes with the reference set and the values are in the same normalized format and 6) combine data from various data points without the limitations imposed by the different entity Identifiers. This is possible due to the record linkage mappings contained in the reference set, that allow joins across any identifier inside the data segment.

Figure 11:
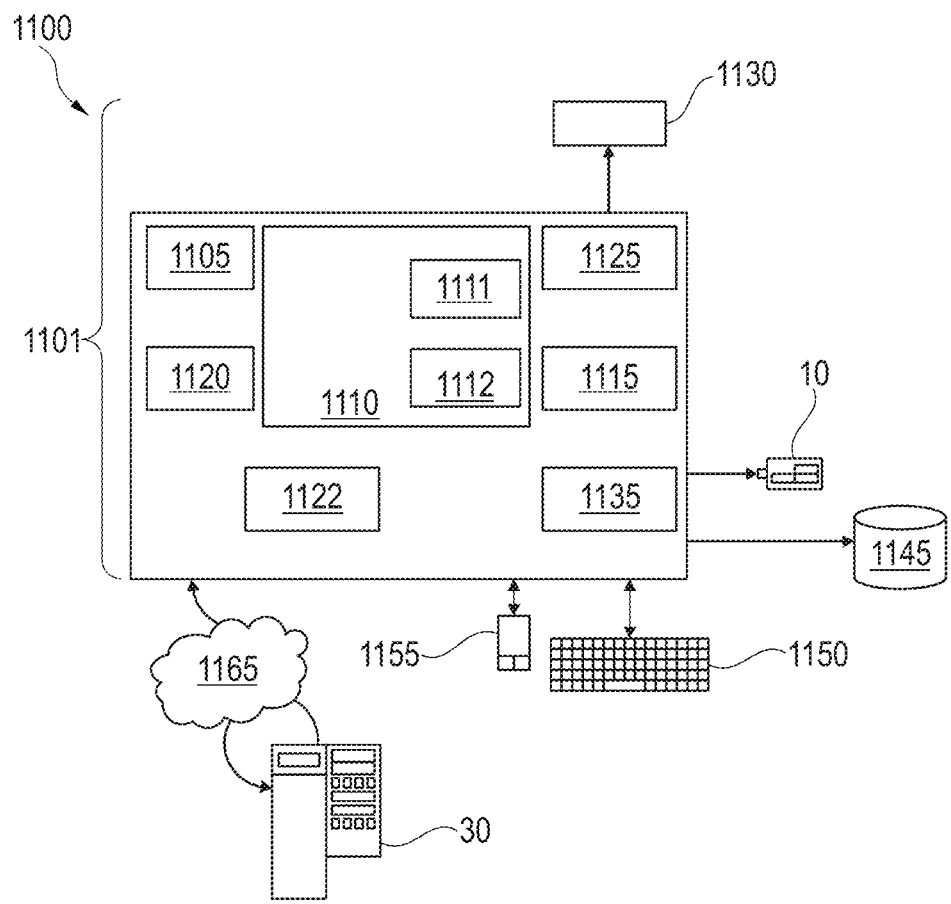
FIG. 11 represents a general computerized system suited for implementing at least part of method steps as involved in the disclosure.

FIG. 11 represents a general computerized system 1100 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 1112, 1122 (including firmware 1122), hardware (processor) 1105, or a combination thereof. In exemplary embodiments, the methods described herein are implemented in software, as an executable program, and is executed by a special or general-purpose digital computer, such as a personal computer, workstation, minicomputer, or mainframe computer. The most general system 1100 therefore includes a general-purpose computer 1101.

In exemplary embodiments, in terms of hardware architecture, as shown in FIG. 11, the computer 1101 includes a processor 1105, memory (main memory) 1110 coupled to a memory controller 1115, and one or more input and/or output (I/O) devices (or peripherals) 10, 1145 that are communicatively coupled via a local input/output controller 1135. The input/output controller 1135 can be, but is not limited to, one or more buses or other wired or wireless connections, as is known in the art. The input/output controller 1135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 1145 may generally include any generalized cryptographic card or smart card known in the art.

The processor 1105 is a hardware device for executing software, particularly that stored in memory 1110. The processor 1105 can be any custom made or commercially available processor, a central processing unit (CPU), an auxiliary processor among several processors associated with the computer 1101, a semiconductor-based microprocessor (in the form of a microchip or chip set), or generally any device for executing software instructions.

The memory 1110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 1110 can have a distributed architecture, where various components are situated remote from one another, but can be accessed by the processor 1105.

The software in memory 1110 may include one or more separate programs, each of which comprises an ordered listing of executable instructions for implementing logical functions, notably functions involved in embodiments of this invention. In the example of FIG. 11, software in the memory 1110 includes instructions 1112 e.g. instructions to manage databases such as a database management system.

The software in memory 1110 shall also typically include a suitable operating system (OS) 1111. The OS 1111 essentially controls the execution of other computer programs, such as possibly software 1112 for implementing methods as described herein.

The methods described herein may be in the form of a source program 1112, executable program 1112 (object code), script, or any other entity comprising a set of instructions 1112 to be performed. When a source program, then the program needs to be translated via a compiler, assembler, interpreter, or the like, which may or may not be included within the memory 1110, so as to operate properly in connection with the OS 1111. Furthermore, the methods can be written as an object-oriented programming language, which has classes of data and methods, or a procedure programming language, which has routines, subroutines, and/or functions.

In exemplary embodiments, a conventional keyboard 1150 and mouse 1155 can be coupled to the input/output controller 1135. Other output devices such as the I/O devices 1145 may include input devices, for example but not limited to a printer, a scanner, microphone, and the like. Finally, the I/O devices 10, 1145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 1145 can be any generalized cryptographic card or smart card known in the art. The system 1100 can further include a display controller 1125 coupled to a display 1130. In exemplary embodiments, the system 1100 can further include a network interface for coupling to a network 1165. The network 1165 can be an IP-based network for communication between the computer 1101 and any external server, client, and the like via a broadband connection. The network 1165 transmits and receives data between the computer 1101 and external systems 30, which can be involved to perform part, or all of the steps of the methods discussed herein. In exemplary embodiments, network 1165 can be a managed IP network administered by a service provider. The network 1165 may be implemented in a wireless fashion, e.g., using wireless protocols and technologies, such as WiFi, WiMax, etc. The network 1165 can also be a packet-switched network such as a local area network, wide area network, metropolitan area network, Internet network, or other similar type of network environment. The network 1165 may be a fixed wireless network, a wireless local area network W(LAN), a wireless wide area network (WWAN) a personal area network (PAN), a virtual private network (VPN), intranet or other suitable network system and includes equipment for receiving and transmitting signals.

If the computer 1101 is a PC, workstation, intelligent device or the like, the software in the memory 1110 may further include a basic input output system (BIOS) 1122. The BIOS is a set of essential software routines that initialize and test hardware at startup, start the OS 1111, and support the transfer of data among the hardware devices. The BIOS is stored in ROM so that the BIOS can be executed when the computer 1101 is activated.

When the computer 1101 is in operation, the processor 1105 is configured to execute software 1112 stored within the memory 1110, to communicate data to and from the memory 1110, and to generally control operations of the computer 1101 pursuant to the software. The methods described herein and the OS 1111, in whole or in part, but typically the latter, are read by the processor 1105, possibly buffered within the processor 1105, and then executed.

When the systems and methods described herein are implemented in software 1112, as is shown in FIG. 11, the methods can be stored on any computer readable medium, such as storage 1120, for use by or in connection with any computer related system or method. The storage 1120 may comprise a disk storage such as HDD storage.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
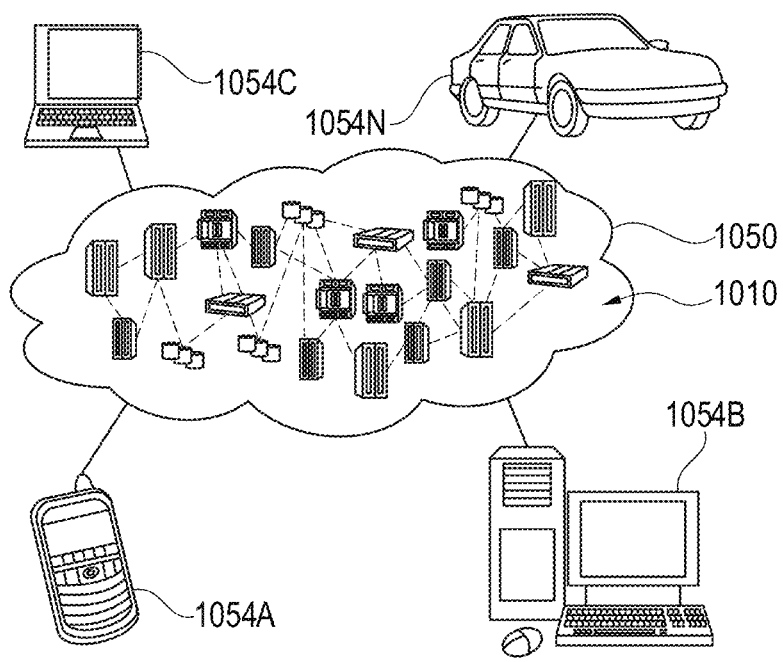
FIG. 12 depicts a cloud computing environment according to an embodiment of the present invention.

Referring now to FIG. 12, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 12 are intended to be illustrative only and that computing nodes 1010 and cloud computing environment 1050 can communicate with any type of computerized device over any type of network and/or network addressable connection (e.g., using a web browser).

Figure 13:
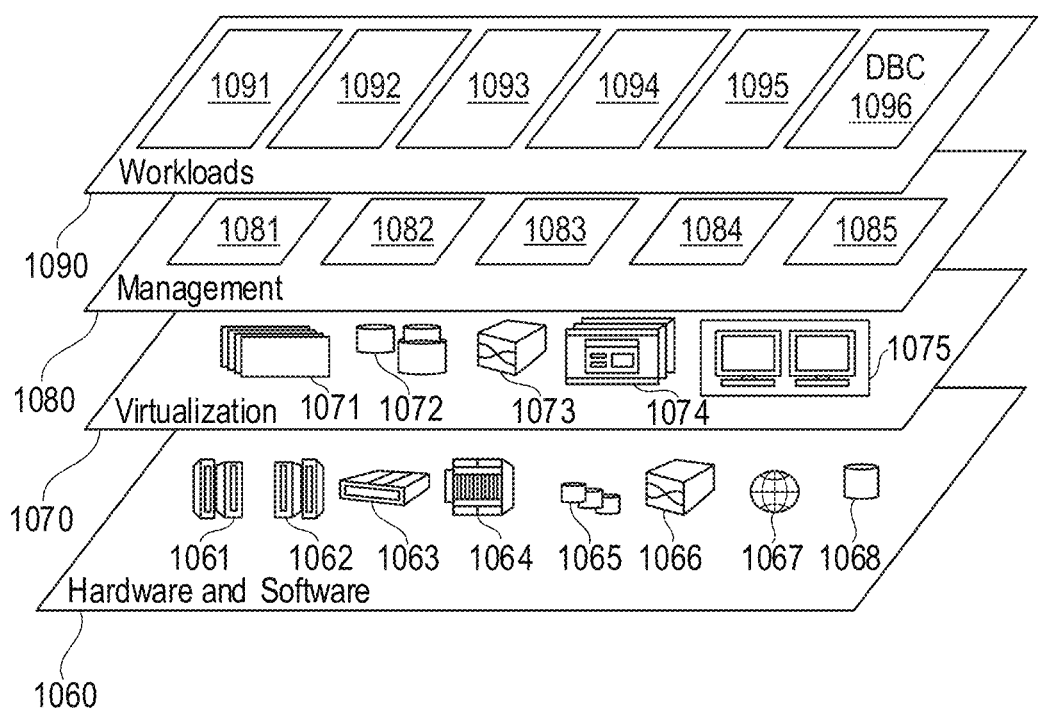
FIG. 13 depicts abstraction model layers according to an embodiment of the present invention.

Referring now to FIG. 13, a set of functional abstraction layers provided by cloud computing environment 1050 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and creation of databases from a data lake (DBC) 1096 in accordance with the present subject matter e.g., as described with reference to FIG. 2, 4, 5, 6 or 8A.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for creating a database for a domain specific application, the method comprising:
   providing, by one or more processors, a centralized data repository comprising data from different sources;
   identifying, by one or more processors, a set of data units of the repository that represent a specific domain;
   determining, by one or more processors, a pivotal entity type for an application based, at least in part, on input from one or more subject matter experts, wherein the pivotal entity type is the most significant entity type for the application;
   determining, by one or more processors, based at least in part on the set of data units, a mapping between different identifiers of the pivotal entity type;
   creating, by one or more processors, a reference set by selecting a first subset of the set of data units using the set of data units and the mapping, wherein the first subset of the set of data units represents the pivotal entity type;
   selecting, by one or more processors, based at least in part on the mapping, a second subset of the set of data units, wherein the second subset of the set of data units represents non-pivotal entity types which are related to instances of the pivotal entity type in the reference set; and
   creating, by one or more processors, a database from data units and associated attributes selected from the reference set of data units and the second subset of data units.

2. The method of claim 1, further comprising a preparation phase and an application phase, the preparation phase comprising the identifying of the set of data units, the determining of the pivotal entity type, the determining of the mapping, the creating of the reference set, and the selecting of the second subset, and the application phase comprising the creating of the database.

3. The method of claim 2, the application phase being performed in real-time.

4. The method of claim 2, further comprising repeatedly performing the application phase.

5. The method of claim 2, the preparation phase resulting in a data segment associated with the application, the data segment comprising the mapping, the reference set, and the second subset of data units, the method further comprising repeating the preparation phase for a further application, resulting in a respective data segment for the further application, wherein the providing of the centralized data repository comprises providing the reference set and the second subset of each of the data segments, and wherein the selected data units are part of one of the data segments.

6. The method of claim 2, further comprising repeating the preparation phase and the application phase for a further application, thereby creating another database for the further application.

7. The method of claim 1, further comprising repeating, for another pivotal entity type, the determining of the mapping, the creating of the reference set, the selecting of the second subset, and the creating of the database.

8. The method of claim 1, further comprising automatically updating the database according to a detected change in the centralized data repository.

9. The method of claim 1, further comprising, in response to detecting a change in the centralized data repository, updating, according to the change, the set of data units, the mapping, the reference set of data units, and the second subset of data units.

10. The method of claim 1, wherein the determining of the pivotal entity type comprises determining a set of pivotal attributes of the pivotal entity type, and wherein the reference set comprises values of the set of pivotal attributes.

11. The method of claim 10, the second index covering values of the attributes from a selected source of the different sources.

12. The method of claim 10, further comprising:
   creating, by one or more processors, a first index that covers the set of pivotal attributes of all instances of the pivotal entity type in the reference set and the associated mapping;
   for each non-pivotal entity type, creating, by one or more processors, a second index covering attributes of the second subset that are semantically equivalent to the set of pivotal attributes; and
   using, by one or more processors, the first index and the second index to retrieve the selected data units.

13. The method of claim 1, further comprising:
   grouping, by one or more processors, the second subset of data units into data packages, each data package representing a sub-domain of the specific domain.

14. The method of claim 1, further comprising:
   generating, by one or more processors, an export query based on the data units and associated attributes selected from the reference set and the second subset;
   executing, by one or more processors, the export query to create the database; and
   saving, by one or more processors, the export query for further execution of the export query.

15. The method of claim 1, further comprising storing, by one or more processors, the database in a user sandbox.

16. The method of claim 1, the centralized data repository comprising a data lake.

17. The method of claim 1, each data unit selected from the group consisting of one or more records, one or more columns, and one or more tables.

18. The method of claim 1, the selecting of the data units from the reference set of data units and the second subset of data units comprising:
   applying a filter on one or more pivotal attributes of the pivotal entity type of the reference set, resulting in a filtered subset of the reference set;
   based at least in part upon a size of the filtered subset, applying the filter on the selected data units.

19. A computer program product comprising:
   one or more computer readable storage media and program instructions stored on the one or more computer readable storage media, the program instructions comprising instructions to:

provide a centralized data repository comprising data from different sources;

identifying, by one or more processors, a set of data units of the repository that represent a specific domain;

determine a pivotal entity type for an application based, at least in part, on input from one or more subject matter experts, wherein the pivotal entity type is the most significant entity type for the application;

determine, based at least in part on the set of data units, a mapping between different identifiers of the pivotal entity type;

create a reference set by selecting a first subset of the set of data units using the set of data units and the mapping, wherein the first subset of the set of data units represents the pivotal entity type;

select, based at least in part on the mapping, a second subset of the set of data units, wherein the second subset of the set of data units represents non-pivotal entity types which are related to instances of the pivotal entity type in the reference set; and create a database from data units and associated attributes selected from the reference set of data units and the second subset of data units.

20. A computer system comprising:

one or more computer processors;

one or more computer-readable storage media;

program instructions stored on the computer-readable storage media for execution by at least one of the one or more processors, the program instructions comprising instructions to:

provide a centralized data repository comprising data from different sources;

identifying, by one or more processors, a set of data units of the repository that represent a specific domain;

determine a pivotal entity type for an application based, at least in part, on input from one or more subject matter experts, wherein the pivotal entity type is the most significant entity type for the application;

determine, based at least in part on the set of data units, a mapping between different identifiers of the pivotal entity type;

create a reference set by selecting a first subset of the set of data units using the set of data units and the mapping, wherein the first subset of the set of data units represents the pivotal entity type;

select, based at least in part on the mapping, a second subset of the set of data units, wherein the second subset of the set of data units represents non-pivotal entity types which are related to instances of the pivotal entity type in the reference set; and create a database from data units and associated attributes selected from the reference set of data units and the second subset of data units.

* * * * *